3,147,109
SEPARATION OF PLUTONIUM, URANIUM, AMERICIUM AND FISSION PRODUCTS FROM EACH OTHER
James B. Knighton, Joliet, and Robert K. Steunenberg, Naperville, Ill., assignors to the United States of America as represented by the United States Atomic Energy Commission
Filed May 3, 1963, Ser. No. 277,966
13 Claims. (Cl. 75—84.1)

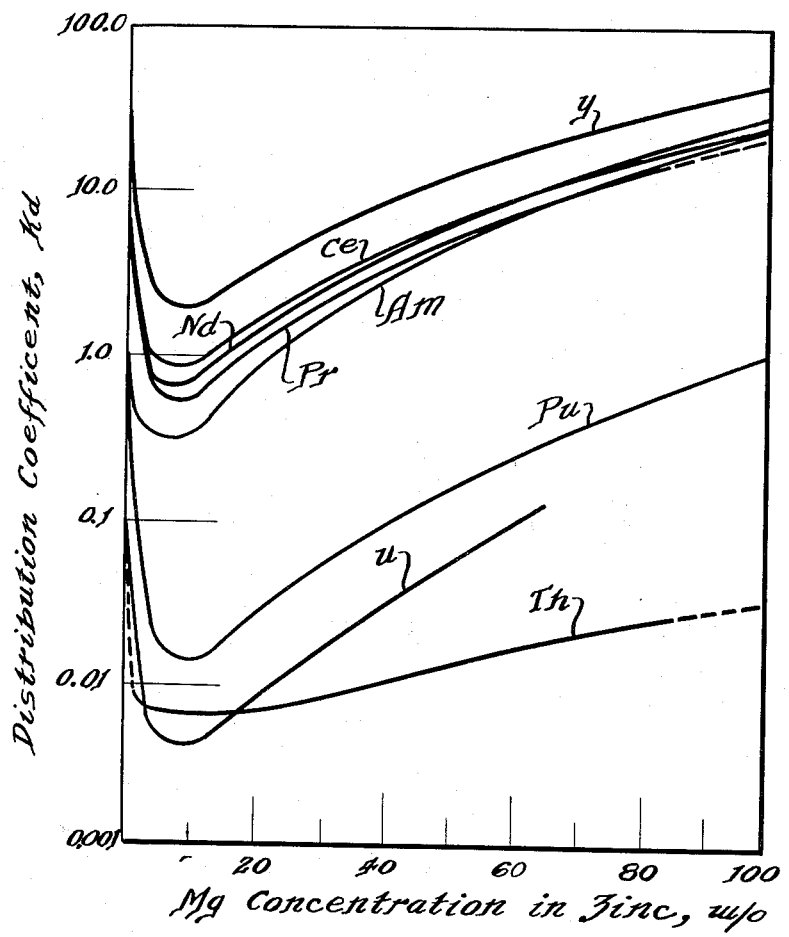

This invention deals with a process of separating lanthanide rare earths, yttrium and americium from plutonium and also from uranium present together in neutron-bombarded uranium and in particular with the separation of americium from plutonium. This application is a continuation-in-part of our application Serial Number 233,984, filed on October 29, 1962.

Americium is formed from plutonium during storage of the latter. For many purposes, for instance for the production of curium$^{242}$, which is used as a power source in space, americium$^{241}$ is neutron-bombarded and converted by an n,β reaction to curium$^{242}$. In order to have the curium free from fission products, the plutonium has to be removed from the americium prior to neutron bombardment.

Alloys derived from neutron-bombarded nuclear fuel have been treated heretofore by dissolving them in a magnesium-chloride-containing chloride flux and scrubbing the salt solution with a magnesium-zinc alloy. In these processes the magnesium content of the scrubbing alloy was restricted to a range of between 2 and 4% by weight. This process just described is the subject matter of the assignee's copending application Serial Number 199,998, filed by Premo Chiotti on June 4, 1962, now Patent No. 3,120,435, granted on February 4, 1964.

It is an object of this invention to provide a process for the separate recovery of plutonium and americium from mixtures thereof in which an especially high plutonium recovery is obtained.

It is another object of this invention to provide a process for the separate recovery of plutonium and americium from mixtures thereof in which an especially high degree of separation is accomplished.

It is finally also an object of this invention to provide a process for the separate recovery of plutonium and americium from mixtures thereof for which only very few extraction stages are necessary to accomplish practically complete separation.

It has been assumed heretofore that in the process just described a higher magnesium content brings about a higher reduction of metals and thus a lower distribution of the metal chlorides formed into the flux. It was found, most unexpectedly, however, that curves showing the relationship between magnesium concentration in the binary zinc alloy and the distribution coefficient $K_d$ (=w/o of metal in flux: w/o of metal in metal phase) show a minimum at approximately 10 w/o magnesium. At this point the distribution of the metals into the salt phase is lowest, and consequently reduction with magnesium must be highest. On further increasing magnesium content up to 100% magnesium, the distribution coefficient steadily increases, indicating a lower reduction of the chlorides. This is strictly against the law of mass action.

The relationship of magnesium concentration and degree of reduction just discussed was experimentally determined for a number of actinides and lanthanides; the curves based on these experiments are shown in the accompanying drawing. These experiments were carried out in a tantalum crucible at 800° C. in an atmosphere of argon. The flux was magnesium chloride. The distribution of the rare earths was determined by adding the rare earths individually to a molten system of magnesium-zinc alloy and magnesium chloride. After an equilibration period of one hour, samples of both the metal and the flux were taken and analyzed. An additional specified amount of magnesium was then incorporated in order to change the composition of the metal phase and obtain new values for the curves. This procedure was repeated several times.

By this, the volume ratio of flux: metal was varied from 0.7 to 5.0. The metal samples were analyzed for magnesium and for the respective rare earths or actinides, as the case may be. The distribution for samarium was also determined, but it is not shown in the diagram, because its concentrations in the metal phase were below the limit of detection, which is below 0.01%, at all magnesium concentrations.

The curves for yttrium, cerium, praseodymium and neodymium were determined with concentrations between 0.15 and 1.5 w/o in the metal phase and from 1.0 to 4.0 w/o in the flux phase; those for cerium and praseodymium were also carried out at concentrations between 0.003 and 0.4 w/o in the metal phase and from 0.18 to 0.45 w/o in the flux phase. It was found that the concentration of the rare earths had no effect on the distribution coefficients.

The diagrams show that praseodymium is the rare earth that is closest to the distribution of the actinides plutonium, uranium, thorium and americium and that this rare earth probably is the one that is the most difficult to separate from the actinides. For this reason, praseodymium was used in the experiments as a stand-in for all the lanthanide rare earths, assuming that if praseodymium is separable, all other rare earths would be separable all the more. The behavior of americium like a lanthanide rare earth rather than an actinide was quite unexpected.

For a separation of americium from plutonium a magnesium-zinc alloy containing from 10 to 90% by weight of magnesium is suitable.

The process of this invention comprises introducing material containing a mixture of americium and plutonium into a molten halide flux that contains magnesium halide, adding a binary magnesium-zinc alloy in which the magnesium content is at least 10% by weight, whereby americium is preferentially taken up by the flux, while plutonium is preferentially taken up by a metal phase, and separating the flux from the metal phase. The process also covers the introduction of the americium-plutonium material into a magnesium-zinc alloy and adding a magnesium-halide-containing flux whereby the americium is oxidized and the halide formed thereby is taken up by the flux, while the plutonium remains in the metal; and subsequent phase separation.

Plutonium alloys, oxides or chlorides can be used as the starting material for the process of this invention. If the oxides are used, reduction of the plutonium oxide to the metal and separation from the americium are accomplished in one operation. As the flux, either pure magnesium halide or a mixture of magnesium halide with alkali metal halide or alkaline earth halide can be used. Magnesium chloride, for example, has a relatively high melting point (about 710° C.) and therefore is not always the most desirable flux. For instance, an equimolar mixture of lithium chloride and magnesium chloride melts at about 600° C. and is preferred in many instances. Another still lower-melting flux that is suitable is a mixture of 30 mole percent of sodium chloride, 20 mole percent of potassium chloride and 50 mole percent of magnesium chloride; it melts at about 390° C. However, it was found that the higher the concentration of magnesium halide is in the flux, and in particular of magnesium chloride, the higher are the distribution coefficients of the metals into the flux.

It was also found that the type of alkali metal halide has an influence on the distribution coefficients, namely that the halide of the alkali metal having the lighter atomic weight results in a higher distribution into the flux than does an alkali metal halide of a heavier alkali metal. It will be understood to those skilled in the art that many suitable combinations of magnesium halide with alkali metal halide and/or alkaline earth halide can be selected according to process requirements.

It is obvious from the drawing, as has been mentioned before, that the higher magnesium concentration in the binary alloy in all cases yields the higher distribution into the flux; this actually is the finding of the invention. Instead of magnesium-zinc a magnesium-cadmium or magnesium-zinc-cadmium alloy can be used.

The temperature has an effect on the distribution of the various salts into the flux; the lower the temperature, the lower the distribution into the flux. However, this decrease of distribution changes at different rates for different metals with the result that the separation factor, which for praseodymium from plutonium, for instance, is the ratio $$\frac{K_d\ (Pr)}{K_d\ (Pu)}$$

of the lanthonides from the actinides increases with decreasing temperature. This is one important reason for choosing a lower-melting alkali-metal-halide-containing magnesium halide flux instead of pure magnesium halide, although magnesium halide alone brings about a higher distribution into the flux.

In order to determine the effect of the temperature on the distribution of the various components of neutron-irradiated fuel, a number of experiments were carried out at temperatures between 425 and 850° C.; they yielded respective separation factors of 60 and 30. The temperature dependence is almost exclusively caused by a change of the distribution coefficient of plutonium.

Instead of a tantalum crucible, other materials known to those skilled in the art can be used. The separation can be carried out in an ambient atmosphere of air. However, where the crucible material reacts at the elevated temperatures with oxygen and also in cases where the metal layer is lighter than the flux layer, the use of an inert atmosphere, such as argon or helium, is necessary. A repetition of the extraction with the flux will bring about a higher degree of separation.

Phase separation can be carried out by any means known to those skilled in the art. For instance, the layers can be separated by decantation, or the entire mixture can be cooled for solidification and then broken apart by mechanical means.

The isolated magnesium-zinc alloy containing the plutonium is processed for removal of magnesium and zinc. For this purpose, the metal phase is heated above the volatilization temperature of these two metals to distill them off, whereby a residue of pure plutonium remains. This so-called retorting step is preferably carried out in a vacuum, because then lower temperatures can be used. However, an inert atmosphere can also be introduced instead.

In the following, three examples are given for illustrative purposes.

EXAMPLE I

The various distribution coefficients shown in the drawing have been determined, as mentioned, by extracting the various chlorides or metals individually. In one run, however, a mixture of plutonium, uranium and praseodymium was processed under the same conditions as those of the experiments that led to the curves of the drawing. In a second run, similar tests were carried out with americium only. The results obtained are shown in Table I.

Table I

| w/o Mg | $K_d$ (Pu) | $K_d$ (U) | $K_d$ (Pr) | $K_d$ (Am) |
|---|---|---|---|---|
| 0.192 | 1.16 | 5.89×10⁻² | 29.6 | |
| 8.82 | 0.0116 | 5.62×10⁻³ | 0.519 | 0.33 |
| 40.2 | 0.0978 | 3.63×10⁻² | 3.58 | 3.25 |
| 71.6 | 0.294 | 1.44×10⁻¹ | 9.08 | 9.8 |

The distribution coefficients for plutonium, uranium and praseodymium shown in Table I fully agreed with the results of the individual tests shown in the drawing. This proves that the various elements do not have an effect on each other as to their distribution and that conclusions are permissible from the individual curves as to the behavior of the various elements in a mixture, for instance in neutron-bombarded fuel.

EXAMPLE II

A number of runs are carried out with various lanthanides and actinides by equilibrating them in a flux consisting of pure magnesium chloride and a binary magnesium-zinc alloy containing 50% by weight of magnesium. The temperature used is 800° C. At these conditions three phases are obtained: the salt phase containing rare earths, a magnesium-zinc solution containing most of the plutonium and uranium according to its solubility, and a precipitated metal phase containing the insoluble remainder of the uranium. The distribution coefficients, flux solution:Mg-Zn solution, and separation factors from plutonium and uranium are compiled in Table II.

Table II

| Element | $K_d$ | Separation Factor | |
|---|---|---|---|
| | | From Pu | From U |
| Pu | 0.16 | | 2.91 |
| U | 0.055 | 0.344 | |
| Pr | 5.3 | 33.1 | 96.4 |
| Nd | 7.0 | 43.7 | 127.2 |
| Ce | 7.2 | 45.0 | 131.0 |
| Y | 11.5 | 71.8 | 209.0 |

The above values show that with 50% magnesium the distribution coefficients for all lanthanides and yttrium are above unity while those for plutonium and uranium are small and below 1. The separation factors of rare earth lanthanides from uranium and plutonium are satisfactory. The precipitated uranium can be readily separated from the metal solution containing the plutonium by means known to those skilled in the art.

Example III illustrates the separation of americium from plutonium.

EXAMPLE III

A mixture of plutonium and americium metals was processed. The mixture was introduced into a tantalum crucible, and 300 grams of magnesium chloride were added thereto. Thereafter 200 grams of zinc were incorporated. The reaction mixture was heated to 800° C. in an argon atmosphere and stirred at a rate of 300 r.p.m. After an equilibration period of one hour, samples were taken of both flux and metal phases and analyzed for americium and plutonium, respectively. From these analyses the distribution coefficients were determined, and from the distribution coefficients the separation factors were calculated, which are the distribution coefficients for americium divided by those for plutonium.

Thereafter magnesium was added, and the process, including analyses, was repeated. A number of additional runs were carried out with different magnesium concentrations, including 100%. In the table below, the distribution coefficients $K_d$ and the separation factors obtained with the various magnesium concentrations in the reducing alloy are summarized.

Table III

| Mg Conc., w/o | $K_d$ Am | $K_d$ Pu | Separation Factor $K_d$ Am:$K_d$ Pu |
|---|---|---|---|
| 5 | 0.32 | 0.018 | 18 |
| 10 | 0.35 | 0.015 | 23 |
| 20 | 0.84 | 0.027 | 31 |
| 30 | 1.72 | 0.056 | 31 |
| 40 | 3.0 | 0.10 | 30 |
| 50 | 4.5 | 0.16 | 28 |
| 60 | 6.5 | 0.24 | 27 |
| 70 | 9.2 | 0.34 | 27 |
| 80 | 12.9 | 0.48 | 27 |
| 90 | 18.0 | 0.66 | 27 |
| 100 | 25.0 | 0.89 | 28 |

The above data show that the separation factors varied comparatively little with a magnesium concentration of above 10%.

It will be understood that the invention is not to be limited to the details given herein but that it may be modified within the scope of the appended claims.

The embodiments of the invention in which an exclusive property or privilege is claimed are defined as follows:

1. A process of separating americium from plutonium present together in a mixture, comprising contacting a molten halide flux solvent that contains at least 50 mole percent of magnesium halide with a binary alloy solvent selected from the group consisting of magnesium-zinc and magnesium-cadmium in which the magnesium content is between 10% and 90% by weight, one of said solvents containing said mixture, whereby the americium is preferentially taken up by the flux while the plutonium is preferentially taken up by a metal phase; and separating the flux from the metal phase.

2. The process of claim 1 wherein the magnesium alloy is magnesium-zinc and has a magnesium concentration of between 20 and 60% by weight.

3. The process of claim 2 wherein the mixture is added to the flux.

4. The process of claim 3 wherein the operating temperature ranges between 425 and 850° C.

5. The process of claim 3 wherein the magnesium halide is magnesium chloride.

6. The process of claim 3 wherein the magnesium halide is mixed with at least one other halide selected from the group consisting of alkali metal halide and alkaline earth halide.

7. The process of claim 6 wherein the flux consists of a mixture of magnesium chloride and alkali metal chloride.

8. The process of claim 3 wherein the separation is carried out in an inert atmosphere.

9. The process of claim 8 wherein the inert atmosphere consists of argon.

10. The process of claim 9 wherein about equal volumes of flux and metal phase are used.

11. The process of claim 10 wherein the flux is magnesium chloride, the temperature is about 800° C. and the atmosphere is argon gas.

12. A process of separating americium from plutonium present together in a mixture, comprising introducing said mixture into a molten magnesium-zinc alloy containing at least 10% by weight of magnesium; adding magnesium chloride to the reaction mass; heating above the melting points, whereby said americium is oxidized to the chloride and taken up by said flux, while the plutonium is taken up in metallic form by said alloy; and separating said flux from said alloy.

13. A process of reducing plutonium oxide, comprising introducing the oxide into a molten magnesium-chloride-containing chloride flux containing at least 50 mole percent of magnesium chloride, adding a magnesium-zinc alloy containing about 10% by weight of magnesium whereby said plutonium oxide is reduced to the metal and the plutonium metal is alloyed with the zinc, and separating a zinc alloy from the magnesium-oxide-containing flux.

References Cited in the file of this patent

UNITED STATES PATENTS 3,109,731 Knighton _____ Nov. 5, 1963
3,120,435 Chiotti _____ Feb. 4, 1964

OTHER REFERENCES

AEC Document ANL–6543, March 1962, pages 49 and 50.

AEC Document ANL–6569, June 1962, pages 39–43.